United States Patent
Ye (10) Patent No.: US 10,067,371 B2
(45) Date of Patent: Sep. 4, 2018

(54) LIQUID CRYSTAL DISPLAY PANEL AND DEVICE

(71) Applicant: Shenzhen China Star Optoelectronics Technology Co., Ltd., Shenzhen (CN)

(72) Inventor: Yanxi Ye, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 331 days.

(21) Appl. No.: 14/892,198

(22) PCT Filed: Aug. 27, 2015

(86) PCT No.: PCT/CN2015/088266
§ 371 (c)(1),
(2) Date: Nov. 19, 2015

(87) PCT Pub. No.: WO2017/031757
PCT Pub. Date: Mar. 2, 2017

(65) Prior Publication Data
US 2017/0059923 A1 Mar. 2, 2017

(30) Foreign Application Priority Data
Aug. 25, 2015 (CN) .......................... 2015 1 0526524

(51) Int. Cl.
*G02F 1/1335* (2006.01)
*G02F 1/1333* (2006.01)
(Continued)

(52) U.S. Cl.
CPC ...... *G02F 1/133512* (2013.01); *G02F 1/1339* (2013.01); *G02F 1/1345* (2013.01);
(Continued)

(58) Field of Classification Search
None
See application file for complete search history.

(56) References Cited

U.S. PATENT DOCUMENTS 9,568,775 B2 * 2/2017 Kim ...................... G02F 1/1339
2002/0005928 A1 1/2002 Hanakawa et al.
(Continued)

FOREIGN PATENT DOCUMENTS

| CN | 101424839 | 5/2009 |
| CN | 101943811 | 1/2011 |

(Continued)

OTHER PUBLICATIONS

Office Action dated May 31, 2017 From the State Intellectual Property Office of the People's Republic of China Re. Application No. 201510526524.9. (6 Pages).

*Primary Examiner* — Edward Glick
*Assistant Examiner* — Anthony G Quash (57) ABSTRACT

A liquid crystal display (LCD) panel and an LCD device are provided. The panel has: a metal layer having transparent portions configured to conveniently cure a sealant and opaque portions; a second transparent conductive layer; and conducting particles positioned between a first substrate and a second substrate and configured to connect a first transparent conductive layer with the second transparent conductive layer. A light-shading layer is aligned with the transparent portions, so that light leakage of the transparent portions is prevented.

17 Claims, 3 Drawing Sheets

(51) Int. Cl.
    *G02F 1/1343*     (2006.01)
    *G02F 1/1345*     (2006.01)
    *G02F 1/1339*     (2006.01)

(52) U.S. Cl.
    CPC .... *G02F 1/13439* (2013.01); *G02F 1/133345* (2013.01); *G02F 1/133514* (2013.01); *G02F 1/134336* (2013.01); *G02F 2001/13398* (2013.01); *G02F 2201/121* (2013.01)

(56) References Cited

U.S. PATENT DOCUMENTS

| | | | |
|---|---|---|---|
| 2003/0035081 A1* | 2/2003 | Jung | G02F 1/1345 349/152 |
| 2008/0284963 A1* | 11/2008 | Kamiya | G02F 1/1339 349/139 |
| 2013/0154949 A1* | 6/2013 | Jamshidi Roudbari | G06F 3/041 345/173 |
| 2016/0291421 A1 | 10/2016 | Wang et al. | |

FOREIGN PATENT DOCUMENTS

| | | |
|---|---|---|
| CN | 102955295 | 3/2013 |
| CN | 103135287 | 6/2013 |
| CN | 103353693 | 10/2013 |
| CN | 104777661 | 7/2015 |

\* cited by examiner

Fig. 1

Prior Art

Fig. 2

Prior Art

Fig. 6

LIQUID CRYSTAL DISPLAY PANEL AND DEVICE

RELATED APPLICATIONS

This application is a National Phase of PCT Patent Application No. PCT/CN2015/088266 having International filing date of Aug. 27, 2015, which claims the benefit of priority of Chinese Patent Application No. 201510526524.9 filed on Aug. 25, 2015. The contents of the above applications are all incorporated by reference as if fully set forth herein in their entirety.

FIELD OF THE INVENTION

The present invention relates to a technological field of liquid crystal displays, and more particularly to a liquid crystal display (LCD) panel and an LCD device.

BACKGROUND OF THE INVENTION

A black column space (BCS)/black matrix (BM) less technology applied in a liquid crystal display panel can reduce one BM process, so as to save manufacturing cost. Generally, spacers which are used to support the thickness of the panel are made of a transparent material, but in the BCS technology, the spacers are made of a black material, so that the spacers of the black materials can directly instead of the BM to achieve a light-shading effect.

In a high vertical alignment (HVA) display mode, the used electric field is a vertical electric field, and a liquid crystal display panel has a transmitting area (transfer pad) 11 which is outside of a display area, so that signals outside of the display area of an array substrate can be transmitted (transferred) into a color filter substrate.

Figure 1:
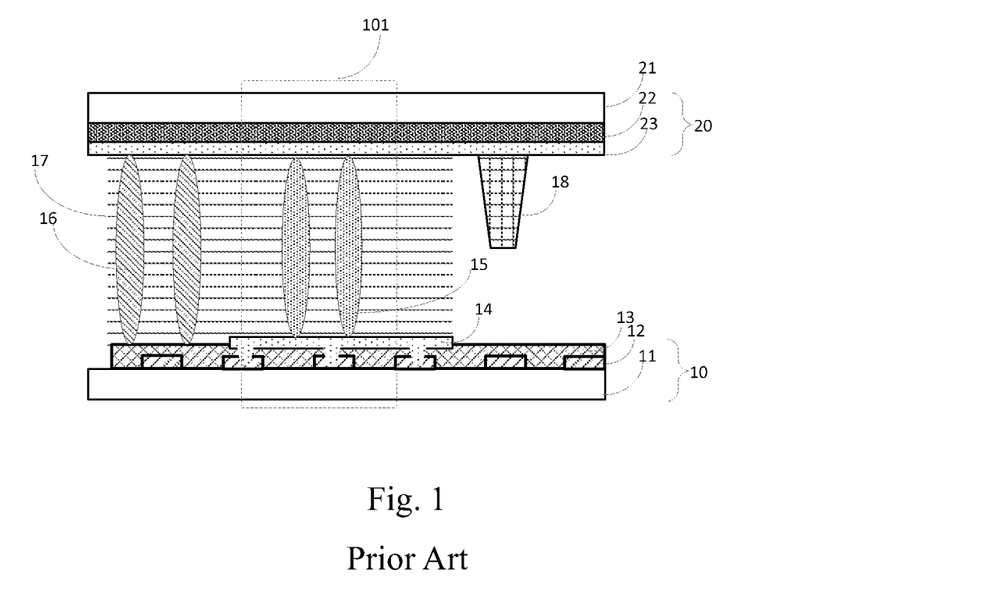
FIG. 1 is a structural schematic view of a first kind of liquid crystal display panel according to a conventional technology.

As shown in FIG. 1, a liquid crystal display panel of a common HVA mode comprises a array substrate 10 and a color filter substrate 20, wherein metal traces 12 are disposed on a substrate base plate 11 of the array substrate, and an insulation layer 13 is disposed on the metal traces, then a first transparent conductive layer 14 is disposed on the insulation layer 13. The first transparent conductive layer 14 is connected with the metal traces 12. A black matrix 22 and a second transparent conductive layer 23 are disposed on a substrate base plate 21 of the color filter substrate, wherein the second transparent conductive layer 23 comprises common electrodes, and spacers 18 are disposed on the second transparent conductive layer 23. The material of the spacers 18 is a transparent material. A sealant 17 is coated between the array substrate and the color filter substrate, and supporting particles 16 are filled into the sealant 17 which is positioned on the edge area of the panel. The first transparent conductive layer 14 is connected with the second transparent conductive layer 23 by a plurality of metal balls 15. That is the signals on the array substrate are transmitted to the common electrodes through the metal traces which are on the periphery of the display area.

Figure 2:
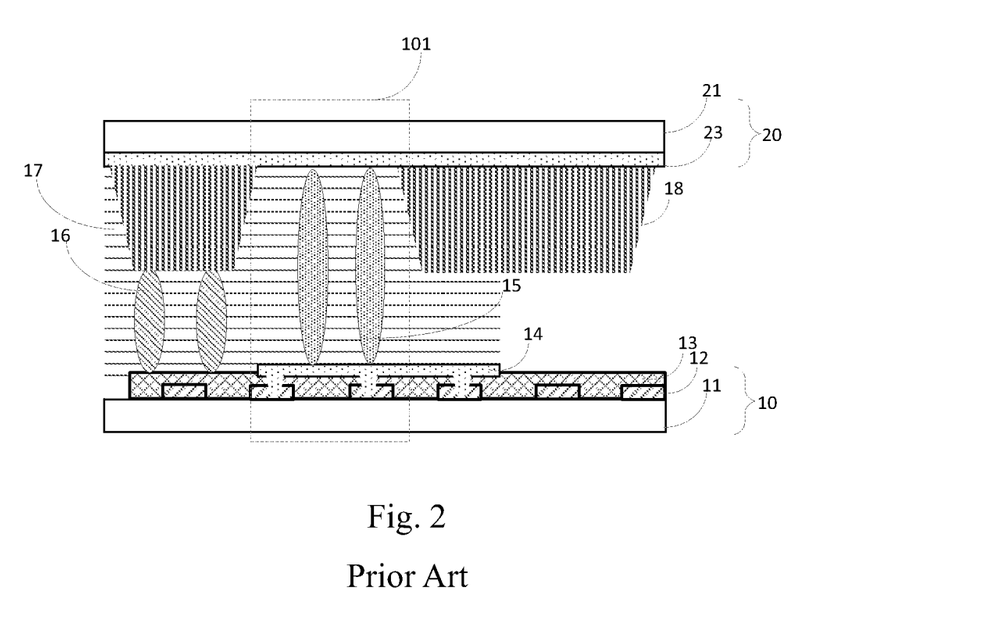
FIG. 2 is a structural schematic view of a second kind of liquid crystal display panel according to a conventional technology.

As shown in FIG. 2, a difference between a liquid crystal display panel which is the HVA mode having the BCS/BM less technology with FIG. 1 is that: the material of the spacers is changed to black material, as shown in numeral 18 of FIG. 2, so that the black matrix 22 is omitted, and by disposing the spacers 18 of black material on the second transparent conductive layer, it can achieve a light-shading effect. However, for implementing the signal transmission in the transmitting area, it is necessary to remove the spacers 18 of black material which are in the area, and because they are no black matrix disposed on the color substrate corresponding to the area, it is easily appear a light leakage phenomenon.

Hence, it is necessary to provide a liquid crystal display panel (LCD) and an LCD device which solve the problems existing in the conventional technologies.

SUMMARY OF THE INVENTION

The object of the present invention is to provide a liquid crystal display (LCD) panel and an LCD device, so as to solve a technical problem that a light leakage in a transmitting area is easily happen when a black matrix is omitted from the liquid crystal display panel.

For solving the above-mentioned technical problems, the present invention constructs a liquid crystal display panel, which comprises:

a first substrate;

a second substrate disposed opposite to the first substrate;

wherein the liquid crystal display panel has a display area and a transmitting area, wherein the display area is configured to display input image signals, and the transmitting area is configured to transmit common signals from an outside of the second substrate to the first substrate;

wherein, within the transmitting area, the first substrate comprises:

a first transparent conductive layer including common electrodes for inputting the common signals; and a light-shading layer positioned on the first transparent conductive layer;

wherein the second substrate comprises:

a metal layer configured to receive the common signals from the outside, and the metal layer has transparent portions and opaque portions, wherein the transparent portions are configured to cure a sealant, and the metal layer has a plurality of transmission lines, and a width of the transmission lines is greater than 10 micro meters and less than or equal to 150 micro meters;

a second transparent conductive layer positioned on the metal layer and configured to transmit the common signals on the metal layer;

conductive particles positioned between the first substrate and the second substrate and configured to connect the first transparent conductive layer with the second transparent conductive layer; and the sealant coated between the first substrate and the second substrate;

wherein the light-shading layer is aligned with the transparent portions, so as to prevent a light leakage of the transparent portions.

In the liquid crystal display panel according the present invention, the material of the light-shading layer is a black matrix.

In the liquid crystal display panel according the present invention, the transmission lines are used for transmitting the common signals from outside, and the plurality of transmission lines are interlaced with each other as a mesh arrangement, so as to form a plurality of grids;

wherein the light-shading layer includes a plurality of light-shading blocks, and the light-shading blocks are aligned with the grids.

In the liquid crystal display panel according the present invention, the shape of the light-shading blocks is a rectangle.

In the liquid crystal display panel according the present invention, outside the transmitting area, the first substrate includes a first transparent conductive layer, which is further provided with spacers, and the material of the spacers is a black material.

In the liquid crystal display panel according the present invention, the first substrate is a color filter substrate, and the second substrate is an array substrate.

For solving the above-mentioned technical problems, the present invention constructs a liquid crystal display panel, which comprises:

a first substrate;

a second substrate disposed opposite to the first substrate;

wherein the liquid crystal display panel has a display area and a transmitting area, wherein the display area is configured to display input image signals, and the transmitting area is configured to transmit common signals from an outside of the second substrate to the first substrate;

wherein, within the transmitting area, the first substrate comprises:

a first transparent conductive layer including common electrodes for inputting the common signals; and a light-shading layer;

wherein the second substrate comprises:

a metal layer configured to receive the common signals from the outside, and the metal layer has transparent portions and opaque portions, wherein the transparent portions are configured to cure a sealant;

a second transparent conductive layer positioned on the metal layer and configured to transmit the common signals on the metal layer;

conductive particles positioned between the first substrate and the second substrate and configured to connect the first transparent conductive layer with the second transparent conductive layer; and the sealant coated between the first substrate and the second substrate;

wherein the light-shading layer is aligned with the transparent portions, so as to prevent a light leakage of the transparent portions.

In the liquid crystal display panel according the present invention, the metal layer has a plurality of transmission lines, and a width of which is greater than 10 micro meters and less than or equal to 150 micro meters.

In the liquid crystal display panel according the present invention, the material of the light-shading layer is a black matrix.

In the liquid crystal display panel according the present invention, the light-shading layer is positioned on the first transparent conductive layer.

In the liquid crystal display panel according the present invention, the metal layer has a plurality of transmission lines, which are used for transmitting the common signals from outside, and the plurality of transmission lines are interlaced with each other as a mesh arrangement, so as to form a plurality of grids;

wherein the light-shading layer includes a plurality of light-shading blocks, and the light-shading blocks are aligned with the grids.

In the liquid crystal display panel according the present invention, an insulation layer is disposed between the metal layer and second transparent conductive layer.

The present further provides a liquid crystal display device, which comprises:

a backlight module; and a liquid crystal display panel, which comprising:

a first substrate;

a second substrate disposed opposite to the first substrate;

wherein the liquid crystal display panel has a display area and a transmitting area, wherein the display area is configured to display input image signals, and the transmitting area is configured to transmit common signals from an outside of the second substrate to the first substrate;

wherein, within the transmitting area, the first substrate comprises:

a first transparent conductive layer including common electrodes for inputting the common signals; and a light-shading layer;

wherein the second substrate comprises:

a metal layer configured to receive the common signals from the outside, and the metal layer has transparent portions and opaque portions, wherein the transparent portions are configured to cure a sealant;

a second transparent conductive layer positioned on the metal layer and configured to transmit the common signals on the metal layer;

conductive particles positioned between the first substrate and the second substrate and configured to connect the first transparent conductive layer with the second transparent conductive layer; and the sealant coated between the first substrate and the second substrate;

wherein the light-shading layer is aligned with the transparent portions, so as to prevent a light leakage of the transparent portions.

In the liquid crystal display device according the present invention, the metal layer has a plurality of transmission lines, and a width of which is greater than 10 micro meters and less than or equal to 150 micro meters.

In the liquid crystal display device according the present invention, the material of the light-shading layer is a black matrix.

In the liquid crystal display device according the present invention, the light-shading layer is positioned on the first transparent conductive layer.

In the liquid crystal display device according the present invention, the metal layer has a plurality of transmission lines, which are used for transmitting the common signals from outside, and the plurality of transmission lines are interlaced with each other as a mesh arrangement, so as to form a plurality of grids;

wherein the light-shading layer includes a plurality of light-shading blocks, and the light-shading blocks are aligned with the grids.

In the liquid crystal display device according the present invention, an insulation layer is disposed between the metal layer and second transparent conductive layer.

In the liquid crystal display panel (LCD) and the LCD device according to the present invention, by disposing the light-shading layer in the transmitting area which has no metal traces positioned therein, so that when in the situation that the black matrix is omitted in the color filter substrate, it can prevent a light leakage of the transmitting area, so as to increase the display effect.

DESCRIPTION OF SPECIFIC EMBODIMENTS OF THE INVENTION

The foregoing objects, features, and advantages adopted by the present invention can be best understood by referring to the following detailed description of the preferred embodiments and the accompanying drawings. Furthermore, the directional terms described in the present invention, such as upper, lower, front, rear, left, right, inner, outer, side, etc., are only directions with reference to the accompanying drawings, so that the used directional terms are used to describe and understand the present invention, but the present invention is not limited thereto. In the drawings, units with similar structures use the same numerals.

Figure 3:
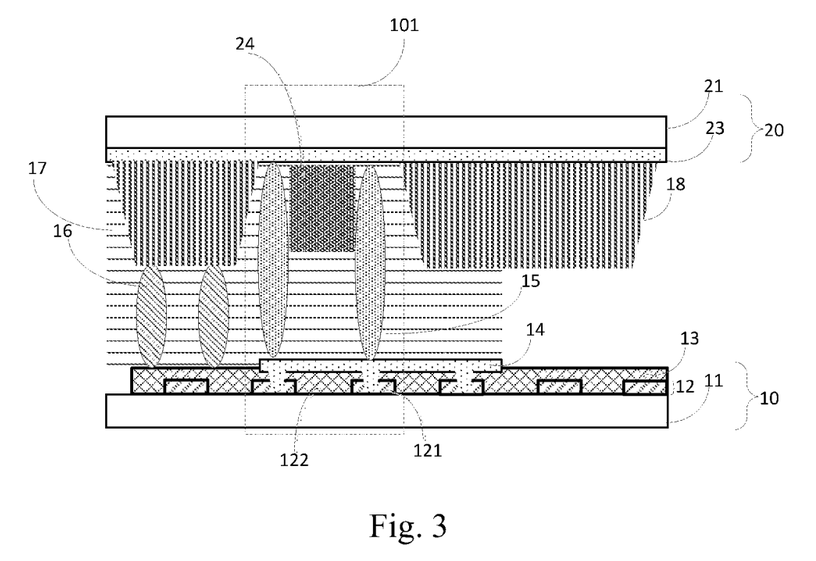
FIG. 3 is a structural schematic view of a liquid crystal display panel according to the present invention.

Refer now to FIG. 3, which is a structural schematic view of a liquid crystal display panel according to the present invention.

As shown in FIG. 3, a liquid crystal display panel according to the present invention comprises a first substrate 20 and a second substrate 10. The liquid crystal display panel has a non-display area and a display area, wherein the non-display area includes a transmitting area 101. The display area is used for displaying input image signals, and the transmitting area is used for transmitting common signals which is outside of the second substrate 10 into the first substrate 20. The first substrate 20 is such as a color filter substrate, and the second substrate 10 is such as an array substrate.

Within the transmitting area 101, the first substrate 20 includes a first transparent conductive layer 23 and a light-shading layer 24, wherein the first transparent conductive layer 23 is positioned on a first substrate base plate 21, and has common electrodes which are used for inputting the common signals.

The second substrate 10 includes a metal layer 12 and a second transparent conductive layer 14. The metal layer 12 is used for receiving the common signals from outside, and the metal layer 12 has transparent portions 122 and opaque portions 121 (the transparent portions are positioned except the parts of the opaque portions). If the metal layer 12 is an entire metal layer, it is disadvantageous in curing a sealant when illuminated by an ultraviolet (UV) ray. Therefore, by the transparent portions 122 being disposed on the metal layer 12, it is convenient to cure the sealant. The second transparent conductive layer 14 is positioned on the metal layer 12, and is connected with the metal layer 12. The second transparent conductive layer 14 is used for transmitting the common signals on the metal layer 12. Additionally, an insulation layer 13 is disposed between the metal layer 12 and second transparent conductive layer 14.

There are conducting particles 15 further positioned between the first substrate 20 and the second substrate 10. The conducting particles 15 are such as metal balls. The conducting particles 15 are used for connecting the first transparent conductive layer 23 and the second transparent conductive layer 14. Additionally, a sealant 17 is coated between the first substrate and the second substrate.

The light-shading layer 24 is aligned with the transparent portions 122, and is used to prevent a light leakage of the transmitting area, and more particularly to prevent the light leakage of the transparent portions.

In the present invention, by the light-shading layer aligned with the transparent portions, and because the metal layer is provided with the transparent portions thereon, it can conveniently cure the sealant. Furthermore, because the light-shading layer is aligned with the transparent portions, it can prevent the light leakage of the transparent portions, so as to increase the display effect.

It is easy to be understood, there are spacers 18 further disposed on the first transparent conductive layer 23. The material of the spacers is a black material, and supporting particles 16 are filled into the sealant 17 which is positioned on the edge area of the panel.

Preferably, the metal layer 12 has a plurality of transmission lines (which is aligned with the opaque portions 121), and the width of the transmission lines is greater than 10 micro meters (um) and less than or equal to 150 micro meters (um).

If the width of the transmission lines is too small, the electrical conductivity ratio of the transmitting area will be decreased. If the width of the transmission lines is too large, it will influence the curing of the sealant, namely it is disadvantageous in fully curing the sealant. Certainly, by increasing the number of the transmitting area, the electrical conductivity ratio thereof will be increased.

Preferably, the material of the light-shading layer 24 is a black matrix.

Preferably, the light-shading layer 24 is positioned on the first transparent conductive layer 23, and compared with the other processing methods, it is convenient in manufacturing process, and decreases manufacturing cost.

Figure 4:
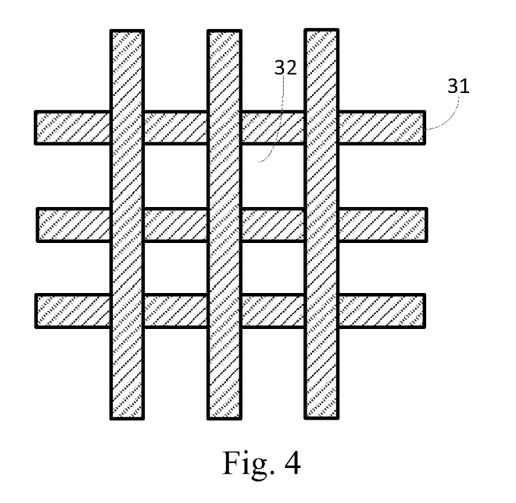
FIG. 4 is a top view of transmission lines according to the present invention.

Preferably, as shown in FIG. 4, the metal layer 12 includes a plurality of transmission lines 31. The transmission lines 31 are used for receiving outer common signals, and the plurality of transmission lines are interlaced with each other to be formed as a mesh arrangement, so as to form a plurality of grids 32.

Figure 5:
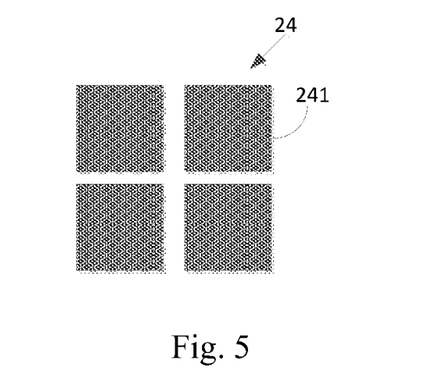
FIG. 5 is a top view of according to the present invention.
Figure 6:
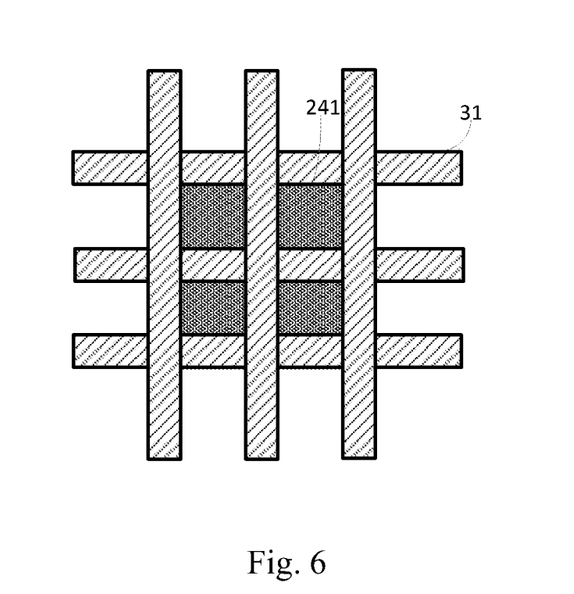
FIG. 6 is a perspective view of combination of the light-shading blocks and the transmission lines according to the present invention.

Refer to FIG. 5 and FIG. 6, the light-shading layer 24 includes a plurality of light-shading blocks 241, and the light-shading blocks 241 are aligned with the positions of the grids 32.

Because the metal layer and the light-shading layer are disposed as above-mentioned structures, it is more simple and convenient for the manufacturing process, so as to save manufacturing cost.

Preferably, the transmission lines 31 comprise a plurality of first transmission lines arranged along a first direction and a plurality of second transmission lines arranged along a second direction. The adjacent two of the first transmission lines and the adjacent two of the second transmission lines are interlaced with each other to be formed as one of the grids. Preferably, the first direction is perpendicular to the second direction, wherein the first direction is such as a horizontal direction, and the second direction is such as a vertical direction.

Preferably, the shape of the light-shading blocks 241 is a rectangle. It is easy to be understood, the shape of the light-shading blocks 241 also can be other shapes which can satisfy shading the light in the transparent portions.

Preferably, the adjacent two of light-shading blocks 241 are disposed with an interval, and the distance between the adjacent two of light-shading blocks 241 is equal to the width of the transmission trace. Therefore, the width of the transmission trace can be better controlled, to more even the width thereof, so as to conveniently control the manufacturing process, and is more advantageous in increasing the display effect.

The present invention further provides a liquid crystal display device, which comprises a backlight module and a liquid crystal display panel. Refer now to FIG. 3, which is a structural schematic view of a liquid crystal display panel according to the present invention.

As shown in FIG. 3, a liquid crystal display panel according to the present invention comprises a first substrate 20 and a second substrate 10. The liquid crystal display panel has a non-display area and a display area, wherein the non-display area includes a transmitting area 101. The display area is used for displaying input image signals, and the transmitting area is used for transmitting common signals which is outside of the second substrate 10 into the first substrate 20. The first substrate 20 is such as a color filter substrate, and the second substrate 10 is such as an array substrate.

Within the transmitting area 101, the first substrate 20 includes a first transparent conductive layer 23 and a light-shading layer 24, wherein the first transparent conductive layer 23 is positioned on a first substrate base plate 21, and has common electrodes which are used for inputting the common signals.

The second substrate 10 includes a metal layer 12 and a second transparent conductive layer 14. The metal layer 12 is used for receiving the common signals from outside, and the metal layer 12 has transparent portions 122 and opaque portions 121 (the transparent portions are positioned except the parts of the opaque portions). If the metal layer 12 is an entire metal layer, it is disadvantageous in curing a sealant when illuminated by an ultraviolet (UV) ray. Therefore, by the transparent portions 122 being disposed on the metal layer 12, it is convenient to cure the sealant. The second transparent conductive layer 14 is positioned on the metal layer 12, and is connected with the metal layer 12. The second transparent conductive layer 14 is used for transmitting the common signals on the metal layer 12. Additionally, an insulation layer 13 is disposed between the metal layer 12 and second transparent conductive layer 14.

There are conducting particles 15 further positioned between the first substrate 20 and the second substrate 10. The conducting particles 15 are such as metal balls. The conducting particles 15 are used for connecting the first transparent conductive layer 23 and the second transparent conductive layer 14. Additionally, a sealant 17 is coated between the first substrate and the second substrate.

The light-shading layer 24 is aligned with the transparent portions 122, and is used to prevent a light leakage of the transmitting area, and more particularly to prevent the light leakage of the transparent portions.

In the present invention, by the light-shading layer aligned with the transparent portions, and because the metal layer is provided with the transparent portions thereon, it can conveniently cure the sealant. Furthermore, because the light-shading layer is aligned with the transparent portions, it can prevent the light leakage of the transparent portions, so as to increase the display effect.

It is easy to be understood, there are spacers 18 further disposed on the first transparent conductive layer 23. The material of the spacers is a black material, and supporting particles 16 are filled into the sealant 17 which is positioned on the edge area of the panel.

Preferably, the metal layer 12 has a plurality of transmission lines (which is aligned with the opaque portions 121), and the width of the transmission lines is greater than 10 micro meters (um) and less than or equal to 150 micro meters (um).

If the width of the transmission lines is too small, the electrical conductivity ratio of the transmitting area will be decreased. If the width of the transmission lines is too large, it will influence the curing of the sealant, namely it is disadvantageous in fully curing the sealant. Certainly, by increasing the number of the transmitting area, the electrical conductivity ratio thereof will be increased.

Preferably, the material of the light-shading layer 24 is a black matrix.

Preferably, the light-shading layer 24 is positioned on the first transparent conductive layer 23, and compared with the other processing methods, it is convenient in manufacturing process, and decreases manufacturing cost.

Preferably, as shown in FIG. 4, the metal layer 12 includes a plurality of transmission lines 31. The transmission lines 31 are used for receiving outer common signals, and the plurality of transmission lines are interlaced with each other to be formed as a mesh arrangement, so as to form a plurality of grids 32.

Refer to FIG. 5 and FIG. 6, the light-shading layer 24 includes a plurality of light-shading blocks 241, and the light-shading blocks 241 are aligned with the grids 32.

Because the metal layer and the light-shading layer are disposed as above-mentioned structures, it is more simple and convenient for the manufacturing process, so as to save manufacturing cost.

Preferably, the transmission lines 31 comprise a plurality of first transmission lines arranged along a first direction and a plurality of second transmission lines arranged along a second direction. The adjacent two of the first transmission lines and the adjacent two of the second transmission lines are interlaced with each other to be formed as one of the grids. Preferably, the first direction is perpendicular to the second direction, wherein the first direction is such as a horizontal direction, and the second direction is such as a vertical direction.

Preferably, the shape of the light-shading blocks 241 is a rectangle. It is easy to be understood, the shape of the light-shading blocks 241 also can be other shapes which can satisfy shading the light in the transparent portions.

Preferably, the adjacent two of light-shading blocks 241 are disposed with an interval, and the distance between the adjacent two of light-shading blocks 241 is equal to the width of the transmission trace. Therefore, the width of the transmission trace can be better controlled, to more even the width thereof, so as to conveniently control the manufacturing process, and is more advantageous in increasing the display effect.

In the liquid crystal display panel and the LCD device according to the present invention, by disposing the light-shading layer in the transmitting area which has no metal traces positioned therein, so that when in the situation that the black matrix is omitted in the color filter substrate, it can prevent a light leakage of the transmitting area, so as to increase the display effect.

The present invention has been described with preferred embodiments thereof and it is understood that many changes and modifications to the described embodiment can be carried out without departing from the scope and the spirit of the invention that is intended to be limited only by the appended claims.

What is claimed is:

1. A liquid crystal display panel, comprising:
a first substrate;

a second substrate disposed opposite to the first substrate;
wherein the liquid crystal display panel has a display area and a transmitting area, wherein the display area is configured to display input image signals, and the transmitting area is configured to transmit common signals from an outside of the second substrate to the first substrate;
wherein, within the transmitting area, the first substrate comprises:
a first transparent conductive layer including common electrodes configured to input the common signals; and
a light-shading layer positioned on the first transparent conductive layer;
wherein the second substrate comprises:
a metal layer configured to receive the common signals from the outside, and the metal layer has transparent portions and opaque portions, wherein the transparent portions are configured to cure a sealant, and the metal layer has a plurality of transmission lines which are interlaced with each other as a mesh arrangement to form a plurality of grids, wherein the grids form the transparent portions and the transmission lines form the opaque portions, and a width of the transmission lines is greater than 10 micro meters and less than or equal to 150 micro meters;
a second transparent conductive layer positioned on the metal layer and configured to transmit the common signals on the metal layer;
conductive particles positioned between the first substrate and the second substrate and configured to connect the first transparent conductive layer with the second transparent conductive layer; and
the sealant coated between the first substrate and the second substrate;
wherein the light-shading layer includes a plurality of light-shading blocks, and the light-shading blocks are aligned with the grids; each of the light-shading blocks has a rectangular shape, and all of the light-shading blocks are arranged in an array; the light-shading layer is aligned with the transparent portions, so as to prevent a light leakage of the transparent portions.

2. The liquid crystal display panel according to claim 1, wherein the material of the light-shading layer is a black matrix.

3. The liquid crystal display panel according to claim 1, wherein the transmission lines are configured to transmit the common signals from outside.

4. The liquid crystal display panel according to claim 1, wherein, outside the transmitting area, the first substrate includes a first transparent conductive layer, which is further provided with spacers, and the material of the spacers is a black material.

5. The liquid crystal display panel according to claim 1, wherein the first substrate is a color filter substrate, and the second substrate is an array substrate.

6. A liquid crystal display panel, comprising:
a first substrate;
a second substrate disposed opposite to the first substrate;
wherein the liquid crystal display panel has a display area and a transmitting area, wherein the display area is configured to display input image signals, and the transmitting area is configured to transmit common signals from an outside of the second substrate to the first substrate;
wherein, within the transmitting area, the first substrate comprises:
a first transparent conductive layer including common electrodes configured to input the common signals; and
a light-shading layer;
wherein the second substrate comprises:
a metal layer configured to receive the common signals from the outside, and the metal layer has transparent portions and opaque portions, wherein the transparent portions are configured to cure a sealant, and the metal layer has a plurality of transmission lines which are interlaced with each other as a mesh arrangement to form a plurality of grids, wherein the grids form the transparent portions and the transmission lines form the opaque portions;
a second transparent conductive layer positioned on the metal layer and configured to transmit the common signals on the metal layer;
conductive particles positioned between the first substrate and the second substrate and configured to connect the first transparent conductive layer with the second transparent conductive layer; and
the sealant coated between the first substrate and the second substrate;
wherein the light-shading layer includes a plurality of light-shading blocks, and the light-shading blocks are aligned with the grids; each of the light-shading blocks has a rectangular shape, and all of the light-shading blocks are arranged in an array; the light-shading layer is aligned with the transparent portions, so as to prevent a light leakage of the transparent portions.

7. The liquid crystal display panel according to claim 6, wherein a width of the transmission lines is greater than 10 micro meters and less than or equal to 150 micro meters.

8. The liquid crystal display panel according to claim 6, wherein the material of the light-shading layer is a black matrix.

9. The liquid crystal display panel according to claim 6, wherein the light-shading layer is positioned on the first transparent conductive layer.

10. The liquid crystal display panel according to claim 6, wherein the transmission lines are configured to transmit the common signals from outside.

11. The liquid crystal display panel according to claim 6, wherein an insulation layer is disposed between the metal layer and second transparent conductive layer.

12. A liquid crystal display device, comprising:
a backlight module; and
a liquid crystal display panel, which comprising:
a first substrate;
a second substrate disposed opposite to the first substrate;
wherein the liquid crystal display panel has a display area and a transmitting area, wherein the display area is configured to display input image signals, and the transmitting area is configured to transmit common signals from an outside of the second substrate to the first substrate;
wherein, within the transmitting area, the first substrate comprises:
a first transparent conductive layer including common electrodes configured to input the common signals; and
a light-shading layer;
wherein the second substrate comprises:
a metal layer configured to receive the common signals from the outside, and the metal layer has transparent portions and opaque portions, wherein the transparent portions are configured to cure a sealant, and the metal layer has a plurality of transmission lines which are interlaced with each other as a mesh arrangement to form a plurality of grids, wherein the grids form the transparent portions and the transmission lines form the opaque portions;

a second transparent conductive layer positioned on the metal layer and configured to transmit the common signals on the metal layer;

conductive particles positioned between the first substrate and the second substrate and configured to connect the first transparent conductive layer with the second transparent conductive layer; and the sealant coated between the first substrate and the second substrate;

wherein the light-shading layer includes a plurality of light-shading blocks, and the light-shading blocks are aligned with the grids; each of the light-shading blocks has a rectangular shape, and all of the light-shading blocks are arranged in an array; the light-shading layer is aligned with the transparent portions, so as to prevent a light leakage of the transparent portions.

13. The liquid crystal display device according to claim 12, wherein a width of the transmission lines is greater than 10 micro meters and less than or equal to 150 micro meters.

14. The liquid crystal display device according to claim 12, wherein the material of the light-shading layer is a black matrix.

15. The liquid crystal display device according to claim 12, wherein the light-shading layer is positioned on the first transparent conductive layer.

16. The liquid crystal display device according to claim 12, wherein the transmission lines are configured to transmit the common signals from outside.

17. The liquid crystal display device according to claim 12, wherein an insulation layer is disposed between the metal layer and second transparent conductive layer.

* * * * *